(12) United States Patent
Agarwal et al.

(10) Patent No.: US 7,070,823 B2
(45) Date of Patent: Jul. 4, 2006

(54) METHOD FOR THE EXTRACTION OF SAFFRON PIGMENTS AND FLAVOR CONCENTRATE

(75) Inventors: Shri Gopal Agarwal, Jammu (IN); Rajinder Kumar Thappa, Jammu (IN); Vijai Kant Agnihotri, Jammu (IN); Om Prakash Suri, Jammu (IN); Ghulam Nabi Qazi, Jammu (IN)

(73) Assignee: Council of Scientific and Industrial Research, New Delhi (IN)

( * ) Notice: Subject to any disclaimer, the term of this patent is extended or adjusted under 35 U.S.C. 154(b) by 542 days.

(21) Appl. No.: 10/334,148

(22) Filed: Dec. 31, 2002

(65) Prior Publication Data

US 2004/0126467 A1 Jul. 1, 2004

(51) Int. Cl.
*A23L 1/223* (2006.01)
*B01D 11/02* (2006.01)

(52) U.S. Cl. ............... 426/429; 426/250; 426/431; 426/655; 426/638

(58) Field of Classification Search ............... 426/250, 426/429, 431, 655, 638
See application file for complete search history.

(56) References Cited

U.S. PATENT DOCUMENTS 5,085,995 A * 2/1992 Otsuka et al. ............... 435/41
6,458,399 B1 * 10/2002 Garcia Fernandez ........ 426/429

OTHER PUBLICATIONS

Kim et al., "Suspension Culture of Gardenia Jasminoides Ellis Cell For Production of Yellow Pigment," Journal of Microbiology and Biotechnology, vol. 1, No. 2, 1991, pp. 142-149.

Zarghami et al., "Monoterpene Aldehydes and Isophorone-Related Compounds of Saffron," Phytochemistry, Pergamon Press, vol. 10, 1971, pp. 2755-2761.
Raina et al., "Changes in Pigments and Volatiles of Saffron (*Crocus sativus* L) During Processing and Storage," J. Sci. Food. Agric. SCI, vol. 71, 1996, pp. 27-32.
Sastry et al., "Saffron (*Crocus Sativus* Linn.)," Journal of Scientific & Industrial Research, vol. 14A, No. 4, Apr. 1955, pp. 178-185.
Chemical Abstracts, Key to the World's Chemical Literature, The American Chemical Society, vol. 105, No. 9, Sep. 1, 1986, p. 376.
Chemical Abstracts, Key to the World's Chemical Literature, The American Chemical Society, vol. 121, No. 9, Aug. 29, 1994, p. 595.
Chemical Abstracts, Key to the World's Chemical Literature, The American Chemical Society, vol. 133, No. 18, Oct. 30, 2000, p. 888.

* cited by examiner

*Primary Examiner*—Milton I. Cano
*Assistant Examiner*—Adepeju O. Pearse
(74) *Attorney, Agent, or Firm*—Foley & Lardner LLP

(57) ABSTRACT

The present invention relates to an efficient method for the extraction of high stability, superior quality, value added, standardized, ready-to-use saffron pigments and flavor concentrate, the process comprising steps of mixing saffron with one food-grade solvent or a combination of more than one food graded-solvents, macerating and agitating the mixture with continuance protection from light condition, centrifuging the macerated mixture to remove undesirable fibrous plant material, cooling the centrifuge immediately, lyophilizing the cooled centrifuge under reduced pressure to obtain crude material, isolating the concentrate by column chromatography, and obtaining brilliant orange color shining saffron pigments and flavor concentrate with recovery of about 95%, and use of the saffron pigments and flavor concentrate of range between 0.05 to 3% in food, pharmaceutical, and allied industries for flavor, and color.

30 Claims, No Drawings

METHOD FOR THE EXTRACTION OF SAFFRON PIGMENTS AND FLAVOR CONCENTRATE

FIELD OF THE PRESENT INVENTION

The present invention relates to an efficient method for the extraction of high stability, superior quality, value added, standardized, ready-to-use saffron pigments and flavour concentrate with recovery of about 95%, and use of the saffron pigments and flavour concentrate of range between 0.05 to 3% in food, pharmaceutical, and allied industries for flavour, and color.

BACKGROUND ART

The current trend in food colorants has increasingly centered on naturally occurring pigments because of consumer preferences. Crocm. the digentiobioside of crocetin. and other crocetin glycosides namely crocetin gentiobioside glucoside crocetin diglucoside and others are probably the only true water-soluble natural carotenoid pigments and are the constituent of saffron, the world's most expensive spice. (Basker D, Negbi M 1983 Uses of saffron. *Eco Boi* 37. 228–236.) and of cape jasmine fruit [(*Gardenia jaxminoidix* Ellis, Ichi T. Katayema T. Toda M 1993 Changes in carotenoid pattern during development of gardenia fruit. *Okayuma Daiguku\ciftikuhn Gakujutsu Hokoku* (Japan) 82, 9–15; (Chem Abstr 1994, 121 : 104261u); Kamikura M. Naka/ato K. 1985 Comparison of natural yellow colors extracted from saffron. *Crocus xaiivux* and gardenia fruit, *Gardenia jasminoides. Eisei Shikensho Hokoku* (Japan) 103, 157–160(Chem Abstr 1986 105: 75885 n)]. Attempts for the production of crocin pigment in cultured cells of *G. jitsminoidis* is also underway [(Nawa Y. Ohtali 1. 1992 Induction of Callus from flesh of *Gardenia jasrninuiJex Ellis* fruit and formation of yellow pigment in the callus. *Biochem* 56. 1732–1736: Kim S H. Park Y G, Lu Y H 1991 Suspension Culture of *Gardenia jasminoides* Ellis cell for production of yellow pigment. *J. Microbial Bioiechnol* 1. 142–149; Kohda H 1991 Production of useful pigments in cultured cells of *Gardenia jasminoidcs* form *glandiflora. Fragrance* .1 44–47)].

The orange-red tripartite stigmas from *Crocus sativns* flowers after drying constitute the saffron of commerce, used for colouring and flavouring food and in the Ayurvedic system of medicine (Sastry L V L, Srinivasan M. Subrahmanyan V 1955 Saffron (*Crocus xativus* I.). *JSci Industr Res* 14A, 178–184). Saffron is valued both for its colouring and flavour properties whereas cape jasmine is a colour source only. Freshly picked saffron is virtually odourless but during drying odoriferous substances develop by degradation of bitter picrocrocm. The saffron taste may be described as somewhat bitter, while its flavour is generally warm honey like and very pleasing.

The plant *C. salivus* L Fam. Iridaceae), a perennial, stemless. low-growing herb with globular corms is a native of Greece and Asia-minor and now cultivated in various parts of the world from Europe to China. Today. Iran is the major supplier to the world market but its quality is not as high as that of the former supplier, Spain. India is also a major producer (approx. 30 tones per annum valued at US S20 million). Successful and significant penetration of the international market will be dependent upon introduction of quality products by India either as such in the form of saffron or through value added newer products. This patent reports a new value added product of saffron. The total concentration of pigments (Crocins). volatile and bitter principles, in processed material was very close to that present in the corresponding starting material i.e. in saffron filaments. Keeping in view, its utility as a ready to serve new flavouring and colouring material, the product and process is likely to be well received by food and pharmaceutical industry. In addition, crocins obtained may also be used for anti-carcinogenic activity and other pharmacological studies [Escribano J, Alonoso G L, Salinas M R and Fernandez J A. 197. n" P970064, Spain; Garcia F E. C. A. (2000) 133: P254466b].

The chief pigments of saffron are Crocetin & its esters Crocin-1 [Crocetin-di-(jS-D-gentiobiosyl) ester], Crocin-2 [CrocetinH3-D-gentiobiosyl)-(l3-D-glucosyl)-ester], Crocin-3 (Crocetin-mono-/J-D-gentiobiosyl ester), Crocin-4 (0-D-monoglucoside ester of monomethyl a-crocetin): Crocetin-di-(/3-D-glucosyl) ester; Croceiin-mono-l8-D-glucosylester; 13-m-Crocin along with minor amounts of Crocetin-(j8-gentiobiosyl)-(/3-neopolitanosyl)-ester, Mangicrocin (mangiferin-6'-O-crocetyl-1"-0-0-D-glucoside ester). a-Carotene, 0-Carotene, lycopene. zeaxanthin, Neapolitanose-(( )-0-D-glucopyranosyl-(1→>2)-p-<ij-D-glucopyranosyl-(1–+6)-D-glucose), 7-O-Glucopyranoside-3-0-sophoroside, 7-O-sophoroside of Kaempferol (flavonol glycosides). Di-/3-D-gentiobiosyl, 0-D-gentiobiosyl-0-D-glucopyranosyl esters. Kaempferol-3-sophoroside and Kaempferol-3-rutinoside-7-glucoside. The stigma also contain carbohydrates, minerals (KO. Na,O. PO,. S( )$_4$. Cl. B and others), vitamins, fat, picrocrocin & volatile oils. The quantitative distribution of pigments in stigmas was established by using UV spectroscopic method. In order to obtain a high quality product, it would be desirable to check the process of hydrolysis of crocin and allied pigments during processing. The concentration of total crocins in various commercial samples varied from 4.0 to 12.0% as determined by UV spectrophotometry at 440 nm.

Fresh stigmas were virtually odourless and most of the flavour compounds were formed by thermal and enzymic degradation of picrocrocin [4-(8-D-glucopyranosyloxy)-2,6, 6-trimethyl-1-cyclohexene-1-carboxaldehyde] into glucose, safranal (2,6,6-trimethyl-1,3-cyclohexadiene-1-carboxaldehyde) and 4-hydroxysafranal (2,6,6-trimethyl-4-fl-hydroxy-1-cyclohexene-1-carboxaldehyde). Safranal further undergoes enzymic reduction and non-en/ymic oxidation, decarboxylation and isomerization to afford isophorone-related compounds. Safranal and isophorone derivatives have been reported as the chief flavour constituents of superior grade saffron (Zarghami N S. Heinz D E 1971 Monoterpene aldehydes and isophorone related compounds of saffron. *Phyiochem* 102755–2761; The volatile constituents of saffron. *Lehenxim Wiss Technol* 42–4).

In India, saffron is produced mostly in J & K State. The conventional methods involve separation of stigma from flowers and post-harvest processing followed by drying to afford saffron of commerce. Earlier, Regional Research Laboratory, Jammu had devised a process for the quality post-harvest processing and drying of saffron to afford product of ISO Standards or even better (Raina B L, Agarwal. S G, Bhatia A K, Gaur G S 1996 Changes in Pigments and Volatiles of Saffron (*Crocus sativus* L.) During Processing and Storage, J Sci. Food Agric. 71. 27–32)

Most of the information on analysis and chemical composition of saffron is of academic interest. No concrete information is available in the literature for the quantitative isolation of total pigments and flavour material (ex *Crocus sativus* stigma or from any other source) into a value-added product economically, hence the necessity for the development of a process. The above mentioned literature survey revealed that most of the important coloring and flavour compounds of saffron are glycosidic in nature, which undergo enzymatic and thermal hydrolysis and degradation during processing and storage thus rendering it difficult to isolate quality determining coloring pigments and flavour compounds in quantitative yields Probably due to this reason, no ready to use saffron preparations are available in the market.

One of the problems faced by the food industry is that most of the carotenoid available in the market are insoluble in water and being extracted from the plant sources with organic solvents like chlorinated solvents and petroleum based aromatic hydrocarbons. Since there are restrictions on the use of solvent extracted pigments and flavors in the processed food industry, thus there is a scope for the development of a process avoiding use of organic solvents for the extraction of ready to use pigments and flavor chemicals for the food industry. The present invention provides a process, which uses so to say natural solvents with total recovery of desirable materials in quantitative yield without solvent residues along with the separation of value added fraction of high utility from the starting materials. Since, saffron is used from a long-long time as food additive, its harmlessness for human consumption has been more than proved, hence of the products thereof. Moreover, recently its great anti-oxidative and anti-tumor activities [Esribano. J et a). Cancer Letters! 19%) 100. 2.1–30) have been demonstrated. Saffron has a very high retail value because its cultivation and collection of flowers is a very labor-intensive process. Saffron collection in fact involves three separate manual steps consisting picking of flowers, separating of stigma and drying or post-harvest processing. To produce 1 kg of saffron, processing of nearly 1.5 lacs to 2.5 lacs flowers is necessary. Introduction of IVth processing step for the production of ready to use/serve freely water-soluble value added product may be of immense value for the food and pharmaceutical industry.

No prior art is available in the literature concerning the present invention.

OBJECTS OF THE PRESENT INVENTION

The main object of the present invention is to develop an efficient method for the extraction of high stability, superior quality, value added, standardized, ready-to-use saffron pigments and flavour concentrate.

Another object of the present invention is to develop a concentrate free from solvent residues.

Yet another object of the present invention is to develop a concentrate used in pharmaceutical, food, and allied industries.

Still another object of the present invention is to develop that helps recover very high percentage of the saffron pigments and flavour compounds as compared to starting material.

Still another object of the present invention is to develop saffron concentrate that does not undergo enzymatic and thermal hydrolysis and degradation during processing.

Still another object of the present invention is to develop a water-soluble concentrate.

Still another object of the present invention is to develop a concentrate free from decomposed impurities.

Still another object of the present invention is to develop a an odour free saffron concentrate.

SUMMARY OF THE PRESENT INVENTION

The present invention relates to an efficient method for the extraction of high stability, superior quality, value added, standardized, ready-to-use saffron pigments and flavour concentrate, said process comprising steps of mixing saffron with one food-grade solvent or a combination of more than one food graded-solvents, macerating and agitating the mixture with continuance protection from light condition, centrifuging the macerated mixture to remove undesirable fibrous plant material, cooling the centrifuge immediately, lyophilizing the cooled centrifuge under reduced pressure to obtain crude material, isolating the concentrate by column chromatography, and obtaining brilliant orange color shining saffron pigments and flavour concentrate with recovery of about 95%, and use of the saffron pigments and flavour concentrate of range between 0.05 to 3% in food, pharmaceutical, and allied industries for flavour, and color.

DETAILED DESCRIPTION OF THE PRESENT INVENTION

Accordingly, the present invention relates to an efficient method for the extraction of high stability, superior quality, value added, standardized, ready-to-use saffron pigments and flavour concentrate, said process comprising steps of mixing saffron with one food-grade solvent or a combination of more than one food graded-solvents, macerating and agitating the mixture with continuance protection from light condition, centrifuging the macerated mixture to remove undesirable fibrous plant material, cooling the centrifuge immediately, lyophilizing the cooled centrifuge under reduced pressure to obtain crude material, isolating the concentrate by column chromatography, and obtaining brilliant orange color shining saffron pigments and flavour concentrate with recovery of about 95%, and use of the saffron pigments and flavour concentrate of range between 0.05 to 3% in food, pharmaceutical, and allied industries for flavour, and color.

In an embodiment of the present invention, wherein an efficient method for the extraction of high stability, superior quality, value added, standardized, ready-to-use saffron pigments and flavour concentrate, said process comprising steps of:

mixing saffron with one food-grade solvent or a combination of more than one food graded-solvents, macerating and agitating the mixture with continuance protection from light condition, centrifuging/filtering the macerated mixture to remove undesirable fibrous plant material, cooling the centrifuge immediately, lyophilizing the cooled centrifuge under reduced pressure to obtain crude material, isolating the concentrate by column chromatography, and obtaining brilliant orange color shining saffron pigments and flavour concentrate with recovery of 95%.

In another embodiment of the present invention, wherein the concentrate is of flavoring and pharmaceutical grade.

In yet another embodiment of the present invention, wherein the saffron is obtained from stigma, or style, or mixture of both, in filament or powder form.

In still another embodiment of the present invention, wherein concentrate is free from solvent residues.

In still another embodiment of the present invention, wherein the concentrate is free soluble in polar solvents.

In still another embodiment of the present invention, wherein the concentrate is used in pharmaceutical, food, and allied industries.

In still another embodiment of the present invention, wherein the chromatography is using silica-gel method.

In still another embodiment of the present invention, wherein said method helps recover about 95% of the saffron pigments and flavour compounds as compared to starting material.

In still another embodiment of the present invention, wherein the pigments are *crocus* pigments.

In still another embodiment of the present invention, wherein the saffron does not undergo enzymatic and thermal hydrolysis and degradation during processing.

In still another embodiment of the present invention, wherein the concentrate is water-soluble.

In still another embodiment of the present invention, wherein the concentrate is free of solvent residues.

In still another embodiment of the present invention, wherein the concentrate is free from decomposed impurities.

In still another embodiment of the present invention, wherein the concentrate is odour free.

In still another embodiment of the present invention, wherein the solvents are food-grade solvents.

In still another embodiment of the present invention, wherein the extraction is at temperature is ranging between 110 to 20° C.

In still another embodiment of the present invention, wherein the atmosphere for the extraction is selected from a group comprising air, inert, hydrogen, helium, and nitrogen.

In still another embodiment of the present invention, wherein the atmosphere is protected from light conditions.

In still another embodiment of the present invention, wherein the extraction is at pH ranging between 4 to 9.

In still another embodiment of the present invention, wherein the extraction is at pH ranging between 6 to 8.

In still another embodiment of the present invention, wherein maceration is for the time duration ranging between 30 minutes and 24 hours.

In still another embodiment of the present invention, wherein the solvent is selected from a group comprising water, steam, superheated steam, alcohols, and ketones.

In still another embodiment of the present invention, wherein the alcohol is of size C1 to C4, or its derivatives, and/or their mixture.

In still another embodiment of the present invention, wherein the centrifuge is cooled at the temperature ranging between 60 to −60° C.

In still another embodiment of the present invention, wherein the centrifuge is cooled at temperature about −10° C.

In still another embodiment of the present invention, wherein rate of extraction slows down with decrease in temperature.

In still another embodiment of the present invention, wherein the rate of extraction is increased with high ratio of raw material to solvent.

In still another embodiment of the present invention, wherein increase in temperature leads to thermal decomposition of crocin pigments into undesirable crocetin.

In still another embodiment of the present invention, wherein all the parameters of the method is critical for obtaining concentrate of desired standards.

In still another embodiment of the present invention, wherein yield of the concentrate is ranging between 10 to 30%.

In still another embodiment of the present invention, wherein the use of the saffron pigments and flavour concentrate in food, pharmaceutical, and allied industries for flavour, and color.

In still another embodiment of the present invention, wherein the concentration of the said concentrate is ranging between 0.05 to 3%.

In still another embodiment of the present invention, wherein the present invention relates to a process for the production of a new value added product of saffron named as Saffron pigments and flavour concentrate. The invention particularly relates to a novel and standardized product for the production of a concentrate containing the original colour and flavour of saffron. More particularly this invention relates to the total extraction of saffron pigments and flavour compounds in a single step without any enzymatic/thermal hydrolysis and degradation of quality determining pigments and flavoring compounds followed by removal of solvent under suitable reduced pressure and temperature into brilliant orange colored shining powder, in varied solvent media under optimum conditions of temperature, pressure. pH and time to get saffron concentrate of high stable quality which is separated from the undesirable fibrous matter by filtration/centrifugation for the recovery of flavoring/pharmaceutical grade. *Crocus* pigments and flavour concentrate of natural *Crocus* .t.

In still another embodiment of the present invention, wherein accordingly, the present invention provides a new process for the production of saffron pigments and flavour concentrate which comprises direct extraction and follow up processing of saffron in a single step with food grade solvents at a temperature in the range of 110 to −10° C. under natural/inert/Hydrogen atmosphere as such or in the dark, at a pH in the range of 4 to 9. for a period of 30 min. to 24 hr. recovering and separating the product by conventional methods.

In still another embodiment of the present invention, wherein the food grade solvents used may be such as water, steam, superheated steam, alcohols and ketones. In another embodiment of the process the atmosphere used may be that of nitrogen, air, hydrogen, helium either as such or in the dark.

In still another embodiment of the present invention, wherein thus, the process of production of saffron pigments and flavour concentrate comprises of the-direct selective extraction of filament or powder saffron in a single step with food grade solvents under continuous maceration and agitation without any enzymatic/thermal decomposition of natural constituents, under natural/dark conditions in varied solvent media if desired, under optimum conditions of temperature in the range of 110 to −10"C. under natural/inert/Nitrogen atmosphere in natural or dark, at a pH in the range of 4 to 9 for a period of 30 min. to 24 hr. recovering and separating the product at a temperature in the range of 60 to −60° C. to get Saffron pigments (colour) and flavour concentrate of high quality, which is separated from the un-extracted fibrous material by conventional methods like centrifugation or filtration.

In still another embodiment of the present invention, wherein in general, the usual relationship of time, temperature, and amount apply in the present case. Preferred temperatures range from 110 to −10° C. is ideal. At lower temperature extraction tends to be slow unless a high ratio of raw material to solvent is utilized. At higher temperature, the thermal decomposition of crocin pigments to undesirable crocetin becomes an increasingly serious side reaction.

In still another embodiment of the present invention, wherein in general, the usual relationship of activity, temperature, pressure, medium and time, along with other physical and chemical parameters apply in the present case. It is important to optimize all the above-mentioned conditions in order to get the desired product.

ADVANTAGES

1. An efficient and new one step process for the production of value added Saffron pigments and flavour concentrate of high stable quality from any type of (such as filament or powder) saffron.
2. The process provides a saffron pigments and flavour concentrate rich in natural pigments and flavoring chemicals. The total pigment concentration in the concentrate is around 10 to 25.6% depending upon the quality of starting material.
3. An improved one step process for the production of Saffron colour and flavour concentrate, which is devoid of the fibrous material and thus suitable as ready to use preparation in the food and pharmaceutical industry.
4. A new one step process for the production of Saffron pigments and flavour concentrate with typical saffron aroma and color which is freely soluble in polar solvents including water and is free from all solvent residues.

The invention is described further with reference to examples given below. The example should not be construed as to restrict the scope of the invention.

EXAMPLE 1

Saffron (10 g.), water (100 ml.) and ethanol (100 ml.) were mixed and macerated at 60° C. efficiently for 4 hours in dark and centrifuged to afford an aqueous material, which was immediately cooled and subjected to lyophilization at a temperature in the range of −20° C. The crude material so obtained was passed over silica gel to afford saffron pigments and flavour concentrate (5.45 g). The product was analyzed by UV spectrophotometry at 440 nm for its pigment concentration (Color value calculated as Crocin by UV estimation at 440 nm=23%).

EXAMPLE 2

Saffron (10 gms) and water (500 ml.) were mixed and macerated at 80° C. efficiently for 30 minutes and filtered to afford an aqueous material, which was stored in deep freezer. The process was repeated three times and mixed extract was concentrated at a temperature in the range of 30–40° C. under inert atmosphere. The crude material so obtained was passed over alumina grade I to afford saffron pigments and flavour concentrate (6.73 g; pigment concentration 10%).

EXAMPLE 3

Saffron (10 gms), diethyl ether (200 ml.) and methanol (400 ml.) were mixed and macerated at 20° C. efficiently for 14 hours with addition of triple distilled water (200 ml.) and centrifuged to afford an aliquot material which was subjected to rotavapor at a temperature in the range of 10"C under reduced pressure. The crude material so obtained was passed over Sephadex column to at lord saffron pigments and flavour concentrate (5.98 g; pigment concentration 17.6%).

EXAMPLE 4

Saffron (10 g,), n-butanol (250 ml.) water (100 ml) and methanol (50 ml.) were mixed and macerated at 5° C. to −5° C. efficiently for 10 hours and centrifuged to afford liquid material which was subjected to lyophilization at a temperature in the range of −30° C. under reduced pressure. The crude material (6.92 g) had pigment concentration of 16.6%.

The invention claimed is:

1. A method for the extraction of saffron pigments and flavor concentrate, said process comprising steps of:
    a. mixing saffron with one food-grade solvent or a combination of more than one food graded-solvents,
    b. macerating and agitating the mixture with continual protection from light,
    c. centrifuging/filtering the macerated mixture to remove undesirable fibrous plant material,
    d. cooling the centrifuge immediately,
    e. lyophilizing the cooled centrifuge under reduced pressure to obtain crude material,
    f. isolating the concentrate by column chromatography, and
    g. obtaining brilliant orange color shining saffron pigments and flavor concentrate, wherein about 95% of the saffron pigments and flavor compounds as compared to the starting material is recovered.
2. A method as claimed in claim 1, wherein the concentrate is of flavoring and pharmaceutical grade.
3. A method as claimed in claim 1, wherein the saffron is obtained from stigma, or style, or a mixture of both, in filament or powder form.
4. A method as claimed in claim 1, wherein concentrate is free from solvent residues.
5. A method as claimed in claim 1, wherein the concentrate is soluble in polar solvents.
6. A method as claimed in claim 1, wherein the concentrate is used in pharmaceutical, food, and allied industries.
7. A method as claimed in claim 1, wherein the chromatography is performed with silica-gel.
8. A method as claimed in claim 1, wherein the pigments are *crocus* pigments.
9. A method as claimed in claim 1, wherein the saffron does not undergo enzymatic and thermal hydrolysis and degradation during processing.
10. A method as claimed in claim 1, wherein the concentrate is water-soluble.
11. A method as claimed in claim 1, wherein the concentrate is free from decomposed impurities.
12. A method as claimed in claim 1, wherein the concentrate is odor free.
13. A method as claimed in claim 1, wherein the solvents are food-grade solvents.
14. A method as claimed in claim 1, wherein the extraction is at temperature is ranging between 110 to 20° C.
15. A method as claimed in claim 1, wherein the atmosphere for the extraction is selected from a group comprising air, inert, hydrogen, helium, and nitrogen.
16. A method as claimed in claim 1, wherein the atmosphere is protected from light conditions.
17. A method as claimed in claim 1, wherein the extraction is at pH ranging between 4 to 9.
18. A method as claimed in claim 17, wherein the extraction is at pH ranging between 6 to 8.
19. A method as claimed in claim 1, wherein maceration is for the time duration ranging between 30 minutes and 24 hours.

20. A method as claimed in claim 1, wherein the solvent is selected from the group consisting of water, steam, superheated steam, alcohols, and ketones.

21. A method as claimed in claim 20, wherein the alcohol is of size C1 to C4.

22. A method as claimed in claim 1, wherein the centrifuge is cooled at the temperature ranging between 60 to −60° C.

23. A method as claimed in claim 22, wherein the centrifuge is cooled at temperature about −10° C.

24. A method as claimed in claim 1, wherein the rate of extraction slows down with decrease in temperature.

25. A method as claimed in claim 1, wherein the rate of extraction is increased with high ratio of raw material to solvent.

26. A method as claimed in claim 1, wherein an increase in temperature leads to thermal decomposition of crocin pigments into undesirable crocetin.

27. A method as claimed in claim 1, wherein lyophilizing the cooled centrifuge is done at a temperature between −15 to −25° C.

28. A method as claimed in claim 1, wherein steps (a) to (c) is repeated on the same saffron more than once.

29. A method as claimed in claim 1, wherein yield of the concentrate is ranging between 10 to 30%.

30. A method as claimed in claim 1, wherein steps (a) to (c) is repeated on the same saffron three times.

* * * * *